United States Patent Office 3,157,198
Patented Nov. 17, 1964

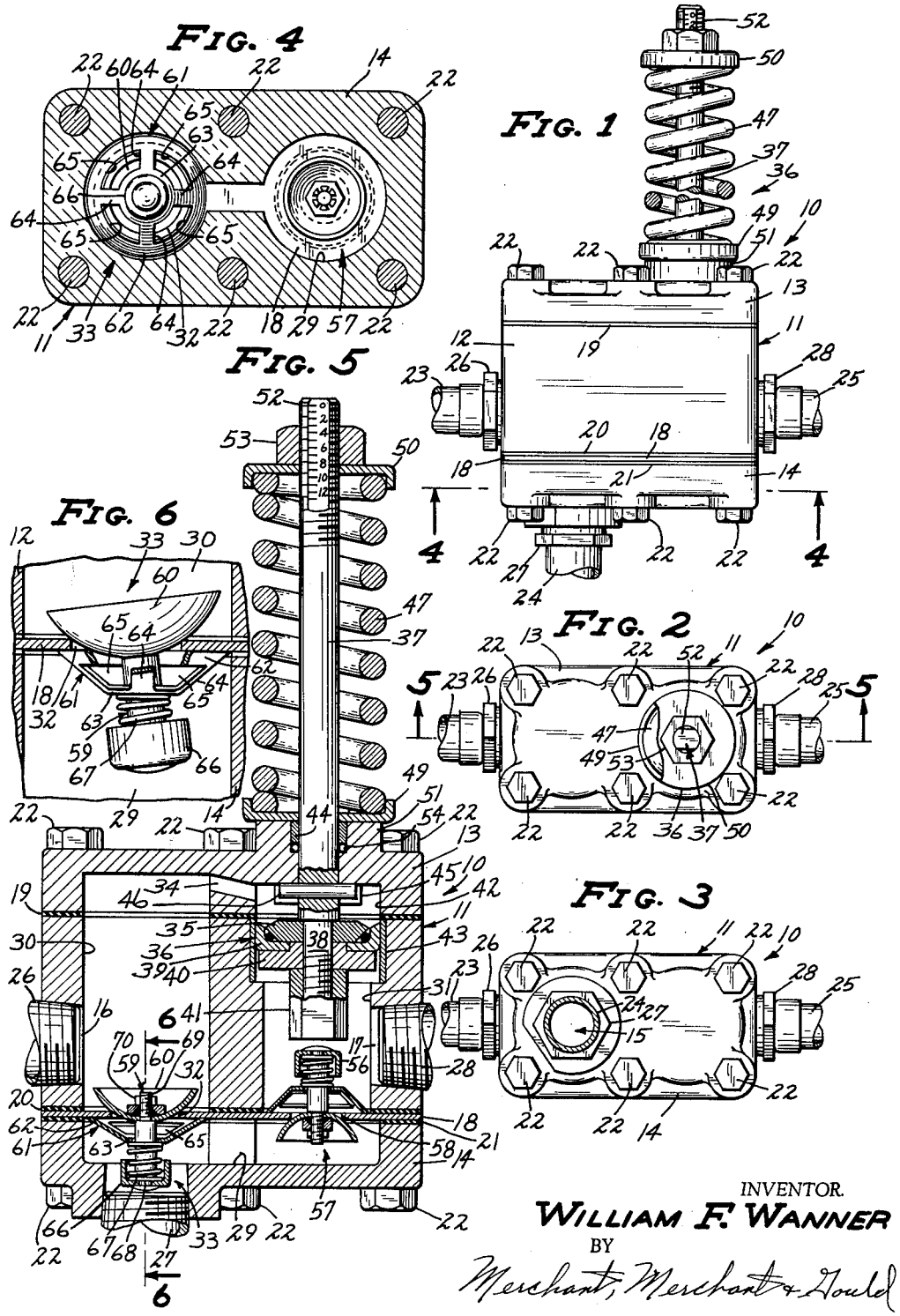

3,157,198
VALVE CONSTRUCTION
William F. Wanner, Minneapolis, Minn., assignor to Seeger-Wanner Corporation, Minneapolis, Minn., a corporation of Minnesota
Filed Aug. 31, 1962, Ser. No. 220,822
3 Claims. (Cl. 137—539)

This invention relates to a hydraulic pressure control and unloader and to an improved check valve therefor.

It is an object of this invention to provide a pressure control and unloader assembly adapted for use in a system where an overflow line returns to a vented tank source of supply.

It is another object of this invention to provide a pressure control and unloader assembly for systems in which pump and engine therefor operate intermittently under load conditions only when the discharge line is open, but in which pressure is continuously maintained in such discharge line.

It is a further object of this invention to provide a pressure control and unloader assembly which, when the discharge line is closed off during operation, automatically eliminates air from the system.

It is another object of this invention to provide a pressure control and unloader assembly employing a plunger operably connected to a pressure-responsive diaphragm such that the plunger is caused to open a check valve in an overflow line whenever pressure in the inlet line exceeds a preset value, such check valve then being opened to an extent generally corresponding to the pressure on said diaphragm.

It is another object of this invention to provide a check valve structure suitable for use with the aforementioned pressure control and unloader assembly.

It is another object of this invention to provide a check valve utilizing a cup-shaped valve element which seats in a valve plate substantially independently of both the velocity and direction of fluid passing therethrough.

It is another object of this invention to provide a check valve utilizing a spider which slidably engages a valve plate as a suspending or supporting element for a cup-shaped valve element seating in said valve plate aperture.

Other and further objects of this invention will become apparent to those skilled in the art from a reading of the present invention taken together with the drawings in which:

FIG. 1 is an elevational view of a hydraulic pressure control and unloader assembly of the invention, parts thereof being broken away;

FIG. 2 is a top view of the embodiment of FIGURE 1, parts thereof being broken away;

FIG. 3 is a bottom view of the embodiment shown in FIGURE 1, some parts thereof shown in section;

FIG. 4 is a horizontal sectional view taken along the line 4—4 of FIGURE 1;

FIG. 5 is a vertical section section taken along the line 5—5 of FIGURE 2; and

FIG. 6 is an enlarged vertical section taken along the line 6—6 of FIGURE 5 showing details of a check valve structure of the invention.

The operation and structure of the check valve of this invention suitable for use with the pressure control and unloader assembly of this invention will be explained first. Referring to FIG. 6, there is shown a valve plate 18, which has a circular aperture 32 therein. A stem 59 extends loosely through said aperture 32. A cup-shaped valve element 60 is mounted on the stem 59. The radius of curvature of cup-shaped valve element 60 preferably corresponds to that of a sphere and the stem 59 joins valve element 60 at the latter's apex. The convex outer wall of cup-shaped valve element 60 seats in aperture 32. The valve is conveniently formed of a metal such as stainless steel. On the opposite side of valve plate 18 from that on which cup-shaped valve element 60 seats is positioned a spider 61. Spider 61 is composed of a rim portion 62, a hub portion 63, and spokes 64 which connect said rim portion 62 with said hub portion 63 and which define ports 65 for fluid passage therethrough.

As those skilled in the art will appreciate that in place of the described spider one could employ as a support element any means, for example, even a rod-shaped element journaling said stem 59, which will function to support and suspend the cup-shaped valve element 60.

Compression spring 67 provides a yielding means extending between the hub portion 63 of spider 61 and the rear end 68 of stem 59 urging stem 59 in a direction to seat valve element 60 in aperture 32. Mounted over the rear end 68 of stem 59 is a cup 66. Cup 66 provides a convenient platform against which force can be exerted to unseat valve element 60, thereby permitting liquid to pass through aperture 32. Cup 66 also provides a spring retainer for spring 67. This cup is conveniently fitted over a restricted end region of the rear end of stem 59, and then the end of stem 59 is simply peened over and riveted against the cup 66. The sides of cup 66 serve to minimize interference of the fluid flow past the spring 67. The cup 66 also limits the extent to which the valve element 60 may be opened, since the sides of cup 66 butt up against the hub portion 63 of spider 61 after valve element 60 is unseated from the valve plate 18.

To fasten the cup-shaped valve element 60 upon the forward end 69 of stem 59, there is conveniently employed a castle nut 70 having a tapered seat. Between castle nut 70 and cup-shaped valve element 60 is positioned an O-ring which circumscribes said stem 59. This O-ring performs a triple service, in that it provides a seal for the joint between the cup-shaped valve element 60 and stem 59; it closes in against the threads on stem 59 as castle nut 70 is drawn down (since the O-ring is located in the tapered seat of nut 70), thereby acting as a lock to prevent the nut 70 from slaking off the stem 59; and it acts as a cushion to absorb the shock resulting from the deceleration of the mass of the stem 59 upon the valve plate 18 and to absorb the shock resulting from the deceleration of the valve mass upon the opening of the cup-shaped valve element 60.

The check valve, as shown in FIG. 6, is operable independently of the angle which stem 59 makes with valve plate 18 as long as the convex wall of valve element 60 can establish seating engagement with valve plate 18 at aperture 32 (i.e., as long as the stem 59 is not tilted so far that the lip of cup-shaped element 60 comes to rest in aperture 32). In the embodiment shown, angular movement of stem 59 is limited by selecting a spider 61 whose rim portion 62 butts against a casing wall whenever stem 59 is tilted more than a predetermined angle. For similar reasons, as those skilled in the art will appreciate, the valve element 60 is self-seating. The valve is also self-cleaning because as valve element 60 seats, it tends to brush particles aside and/or to cut fibrous materials against the edge of aperture 32.

In FIG. 1 is seen an embodiment of a hydraulic pressure control and unloader assembly of the invention, herein designated in its entirety by the numeral 10. This assembly 10 has a casing 11 which is composed of a mid-section 12 and a top portion 13, and a bottom portion 14.

In the walls of casing 11 are an input inlet 15, a discharge outlet 16, an overflow outlet 17.

Between the bottom portion 14 of casing 11 and the mid-portion 13 of casing 11 is positioned a valve plate 18. In order to obtain a seal between the top portion 13 of casing 11 and the mid-section 12 of casing 11, as well as between valve plate 18 and, respectively, the mid-section 12 of casing 11 and the bottom portion 14 of casing 11, gaskets 19, 20 and 21 are employed. The top portion 13 of casing 11 and the bottom portion 14 of casing 11 are each respectively bolted to the mid-section 12 of casing 11 by bolts 22. Casing 11 is suitably formed of a metal, such as cast aluminum, and valve plate 18 of a metal such as stainless steel. A discharge line 23 is connected to discharge outlet 16 by means of threaded fitting 26; an input line 24 is connected to input inlet 15 through threaded fitting 27; and an overflow line 25 is connected to overflow outlet 17 by means of threaded fitting 28.

Referring to FIGURE 5, it is seen that the interior of casing 11 defines four chambers, to wit, an inlet chamber 29, a valve chamber 30, a discharge chamber 31 and plunger chamber 42. Between inlet chamber 29 and valve chamber 30 extends valve plate 18. An aperture 32 provides a passageway between inlet chamber 29 and valve chamber 30 and an aperture 58 provides a passageway between inlet chamber 29 and discharge chamber 31. A first check valve, herein designated in its entirety by the numeral 33, is fitted around aperture 32 so as to control fluid passage therethrough. While no special check valve means need be employed here, the first check valve means 33 shown here is preferred. Its operation has been described supra. Suffice it here to say that this first check valve means 33 permits unidirectional flow of fluid from said inlet chamber 29 into said valve chamber 30 and is operably responsive to fluid pressure in said inlet chamber 29. First check valve 33 opens in response to fluid pressure in inlet chamber 29, thereby permittting passage of fluid from inlet chamber 29 into valve chamber 30. Thus, liquid supplied by a pump (not shown) enters inlet chamber 29 through input inlet 15 from input line 24, passes through first check valve means 33 into valve chamber 30 and exits through discharge outlet 16 into open discharge line 23.

Pressure in valve chamber 30 is transmitted through channel 34 and is impressed on the diaphragm 35 of a pressure-responsive plunger assembly herein designated in its entirety by the numeral 36. Pressure-responsive plunger assembly 36 utilizes a plunger rod 37, both ends of which are threaded. A diaphragm 35 is slipped over threaded forward end 38 of plunger 37, followed by plunger chamber, sealing gasket 39 and diaphragm guide 40. Diaphram 35, sealing gasket 39 and diaphram guide 40 are held in place on plunger 37 by hexagonal plug nut 41 which screws over the threaded forward end 38 of plunger 37. Plunger chamber 42 is provided in casing 11 for the pressure-responsive plunger assembly 36 to move up and down in. This chamber is circular in cross-section and, in the region where the sealing gasket 39 on plunger 37 moves to and fro, the chamber 42 is fitted with a smooth faced sleeve 43 enabling sealing gasket 39 to engage sleeve 43 in liquid-tight relationship.

In order to prevent plunger 37 from rotating, the top central region of chamber 42 is allowed to be integral with the top portion 13 of casing 11, so as to leave a sort of disc-shaped projection 45 in plunger chamber 42 depending from top portion 13 of casing 11. This disc-shaped projection 45 is slotted to receive a bar or tube 46 which pierces plunger 37 along a diameter. Then, as the plunger 37 moves upwards and downwards, bar or tube 46 rides in the slot (not clearly shown in FIG. 5) of disc-shaped projection 45, thereby preventing plunger 37 from rotating. To prevent escape of fluid from plunger chamber 42, there is employed O-ring seal 54. Between O-ring seal 54 and flange 51 is positioned a sleeve 44. To cause the walls of sealing gasket 39 to engage sleeve 43, there is employed O-ring 55.

The force exerted by fluid pressure on the diaphragm 35 of the pressure-responsive plunger assembly 36 is counter-balanced by compression spring 47. Compression spring 47 has its ends housed in cups 49 and 50. The center of each cup 49 and 50 has a hole (not shown) so as to permit each cup to slip over the outside walls of plunger 37. Cup 49 rests on flange 51 of top portion 13 of casing 11. The rear end 52 of plunger 37 is threaded and calibrated so that when a nut 53 is screwed onto plunger 37 and compression spring 47 is compressed, the counterbalancing force exerted on plunger 37 can be conveniently observed. Note that the amount of counterbalancing force which spring 47 can exert upon plunger 37 in response to fluid pressure upon diaphragm 35 can be varied by compressing spring 47 to a greater or lesser extent by means of adjusting nut 53.

The region generally below sealing gasket 39 can fill with fluid and comprises the discharge chamber 31 as noted above. When plunger 37 moves downward in response to predetermined fluid pressure in valve chamber 30, nut 41 on plunger 37 presses against cup 56 of a second check valve herein designated in its entirety by the numeral 57. The operation of the second check valve 57 is similar to that of the preferred first check valve and is described herein above. Suffice is here to say that when plunger 41 presses against cup 56 of second check valve 57, check valve 57 opens, permitting fluid or liquid in inlet chamber 29 to flow therefrom into discharge chamber 31. Fluid in discharge chamber 31 exits therefrom through overflow outlet 17 into overflow line 25.

Thus, as plunger 37 progresses downward, it opens second check valve 57 allowing part of the liquid supplied by the pump to overflow, as to return to a reservoir tank (not shown). The valve opening aperture 58 of second check valve 57 is controlled by the second check valve means 57 so that when second check valve 57 is opened, the amount of such opening is modulated by the extent to which plunger 37 moves downward. Hence, opening valve 57 controls pressure in the system. The force developed on the plunger 37 correlates with the compression setting of the spring 47. The pressure of the system is controlled by modulating the amount of liquid overflowing and passing out through overflow outlet 17. Thus, pressure regulation is obtained using the pressure control and unloader assembly 10.

In summary, this invention comprises a hydraulic pressure control and unloader and relates to an improved check valve suitable for use therein. The check valve comprises a valve plate having a circular aperture therein, a stem extending loosely through said aperture, a cup-shaped valve element mounted on said stem having a convex wall normally seated in said aperture at one side of said valve plate, a support element slidably engaging the opposite side of said valve plate adjacent said circular aperture and loosely journaling said stem, yielding means urging said stem in a direction to seat said valve element in said aperture, and combined sealing and cushioning means positioned between said valve element and said stem. A preferred support element for this check valve comprises a spider including a hub portion loosely journaling said stem, a rim portion slidably engaging the opposite side of said valve plate adjacent said circular aperture, and spokes connecting the hub and rim portions and defining ports for fluid passage therethrough.

The pressure control and unloader, intended primarily for use with liquids, comprises a casing defining an inlet chamber, a valve chamber, a discharge chamber, a discharge outlet from said valve chamber, an input inlet to said inlet chamber, and an overflow outlet from said discharge chamber, a passage between said inlet chamber and said valve chamber and a passage between said inlet chamber and said overflow chamber, a first check valve operably mounted in the passage between said inlet chamber and said valve chamber for unidirectional flow of liquid from said inlet chamber into said valve chamber, a second check valve operably mounted in the passage between the said inlet chamber and said overflow chamber normally closing such passage against flow of fluid from said inlet chamber into said overflow chamber, and a hydraulic pressure sensitive means responsive to pressure changes in said valve chamber and operative to open said second check valve and when pressure in said valve chamber exceeds a predetermined value. The second check valve is constructed in the manner described above and preferably both valves are constructed in this manner.

The pressure sensitive means is mounted in a plunger chamber in the casing and contains a plunger, a pressure responsive diaphragm positioned in said plunger chamber and mounted on said plunger so as to make said plunger move lengthwise in response to pressure in said valve chamber, and spring means counterbalancing pressure on said diaphragm, said plunger being adapted to open said second check valve whenever pressure in said valve chamber exceeds a preset value.

My invention has been thoroughly tested and found to be completely satisfactory for the accomplishment of the above objects, and while I have shown and described a preferred embodiment, I wish it to be specifically understood that the same is capable of modification without departure from the spirit and scope of the appended claims.

I claim:

1. A check valve comprising
   (a) a valve plate having a circular aperture therein,
   (b) a stem extending loosely through said aperture,
   (c) a cup-shaped valve element having a central opening for reception of a portion of said stem and having a convex wall seated in said aperture at one side of said valve plate,
   (d) a generally conical spider including a relatively smaller diameter hub portion loosely journaling said stem, a relatively larger diameter rim portion slidably engaging the opposite side of said valve plate adjacent said circular aperture, and spokes diverging from said hub portion toward said rim portion and connecting the hub and rim portions to define ports for fluid passage therethrough,
   (e) yielding means urging said stem in a direction to seat said valve element in said aperture,
   (f) releasable fastening means securing said valve element on said stem, and
   (g) an O-ring circumscribing said stem between said valve element and said fastening means and providing a seal therebetween.

2. A check valve comprising:
   (a) a valve plate having a circular aperture therethrough,
   (b) a stem extending loosely through said aperture and having a diametrically enlarged intermediate portion and a diametrically reduced end portion cooperating to define an annular shoulder,
   (c) a cup-shaped valve element having a concave inner surface and a convex outer surface defining a portion of a sphere and mounted on said reduced diameter portion of said stem with said convex surface facing toward said shoulder, said convex surface being seated in said aperture at one side of said valve plate,
   (d) a generally conical spider at the opposite side of said valve plate and including a relatively smaller diameter hub portion loosely encompassing said stem and a relatively larger diameter rim portion slidably engaging said opposite side of the valve plate adjacent said aperture, and circumferentially spaced spokes diverging from said hub portion toward said rim portion and connecting said hub and rim portions to define ports for fluid passage therethrough,
   (e) means within the concavity defined by said valve element including a releasable member for anchoring said valve element against said shoulder and sealing the connection between said stem and valve element,
   (f) a cup-shaped stop member on the other end of said stem and having a marginal edge engageable with said spider to limit opening movement of said valve element,
   (g) and a spring having one end received in said cup-shaped member and urging said valve element and stem toward a valve closed position.

3. The structure defined in claim 2 in which said means for anchoring said valve element and sealing the connection thereof to said stem comprises:
   (a) an anchoring nut screw threaded on said diametrically reduced portion of said stem and having a tapered seat facing said valve element,
   (b) and an elastic sealing ring encompassing said reduced stem portion and engaging said tapered seat, said ring being forced into sealing engagement with said reduced stem portion and valve element by said anchoring nut.

References Cited by the Examiner

UNITED STATES PATENTS

| | | | |
|---|---|---|---|
| 1,142,289 | 6/15 | Wadsworth | 137—108 |
| 1,706,737 | 2/29 | Moore | 251—86 XR |
| 2,177,779 | 10/39 | McDonald | 137—540 XR |
| 2,342,001 | 2/44 | Magnuson | 137—108 XR |
| 2,362,713 | 11/44 | Mott | 137—108 XR |
| 2,720,212 | 10/55 | Kimm | 251—86 XR |
| 2,812,979 | 11/57 | Ziesche | 137—541 XR |
| 2,879,794 | 3/59 | Costello | 251—85 XR |
| 3,009,678 | 11/61 | Soderberg | 251—85 |

MARTIN P. SCHWADRON, *Acting Primary Examiner.*